United States Patent [19]

Brady et al.

[11] 4,023,942
[45] May 17, 1977

[54] VARIABLE THROAT VENTURI SCRUBBER

[75] Inventors: Jack D. Brady; Lester K. Legatski, both of San Jose, Calif.

[73] Assignee: FMC Corporation, San Jose, Calif.

[22] Filed: Jan. 22, 1975

[21] Appl. No.: 543,088

Related U.S. Application Data

[63] Continuation of Ser. No. 257,522, May 30, 1972, abandoned.

[52] U.S. Cl. .................................. 55/241; 55/226; 261/62; 261/112; 261/DIG. 54
[51] Int. Cl.² ........................................ B01D 47/10
[58] Field of Search ............ 55/210, 227, 239, 240, 55/235, 241, 242, 252, 257, 259, 92, 230, 226; 261/114, 62, 118, 109, 116, 23, DIG. 54, 112

[56] References Cited

UNITED STATES PATENTS

| | | | |
|---|---|---|---|
| 3,182,977 | 5/1965 | Erni | 55/241 X |
| 3,199,267 | 8/1965 | Hausberg | 55/257 X |
| 3,393,901 | 7/1968 | Krause | 261/DIG. 54 |
| 3,403,497 | 10/1968 | Vander Mey | 55/241 X |
| 3,517,485 | 6/1970 | Dell'Agnese | 55/242 |
| 3,544,086 | 12/1970 | Willett | 55/241 X |
| 3,556,489 | 1/1971 | Veda | 261/62 |
| 3,626,667 | 12/1971 | Mare | 55/240 |
| 3,638,925 | 2/1972 | Braemer | 55/226 X |
| 3,690,044 | 9/1972 | Boresta | 261/DIG. 54 |

OTHER PUBLICATIONS

"High Energy Wet Scrubber System," Received 10/28/68, Western Precipitation Div./Joy Mfg. Co., 1000 West 9th St., L.A. Calif.

*Primary Examiner*—Frank W. Lutter
*Assistant Examiner*—N. Greenblum
*Attorney, Agent, or Firm*—C. E. Tripp

[57] ABSTRACT

A rectangular section venturi scrubber has a double diamond, rectangular insert adjustably mounted therein with the parts proportioned to form diverging, restricted scrubbing throats of substantial length and of constant cross sectional area along their length. Water is introduced into the venturi for collecting dust in gases flowing through the scrubber.

4 Claims, 12 Drawing Figures

FIG_6

FIG_7

FIG_8

FIG_9
INSERT CORRECT-g/f CONSTANT

FIG_10
INSERT TOO LARGE-g/f→∞

FIG_11
INSERT TOO SMALL-g/f→0

FIG_12

X, Y — ENTRANCE DIMENSIONS.  Z — THROAT DEPTH
w — THROAT WIDTH, INSERT FULLY OPEN.
L — THROAT LENGTH.  E — EXIT & INSERT ANGLES
a — SELECTED RATIO $\frac{Z}{w}$ HYDRAULIC DIAMETER — $Dh = \frac{4wZ}{2w + 2Z} = 2\frac{wZ}{w+Z}$

---

$Z = aw \quad L = w \cot E = kw$

FRICTION LOSSES IN THROAT DIRECTLY PROPORTIONAL TO $\frac{L}{Dh}$

$$\frac{L}{Dh} \propto \frac{Kw}{2\frac{aw^2}{(a+1)w}} \propto \frac{K}{2} \cdot \frac{a+1}{a}$$

---

FOR E = 10°, K = 5.67

$\frac{L}{Dh} = \frac{5.67}{2} \cdot \frac{1+1}{1} = 5.67$ $\frac{L}{Dh} = \frac{5.67}{2} \cdot \frac{2+1}{2} = 4.25$ $w = \frac{Z''}{4}$ $\frac{L}{Dh} = \frac{5.67}{2} \cdot \frac{4+1}{4} = 3.55$

VARIABLE THROAT VENTURI SCRUBBER

This is a continuation of application Ser. No. 257,522, filed May 30, 1972, now abandoned.

FIELD OF THE INVENTION

This invention relates to gas and liquid contacting apparatus and more particularly to a venturi type scrubber that is particularly useful for removing solid particles from a large volume gas flow such as that emitted from fossil fueled steam boilers or the like.

Description of the Prior Art

The United States patent to Erni, U.S. Pat. No. 3,182,977, May 11, 1965, discloses in FIG. 2 a rectangular section gas and liquid contact apparatus with a fixed triangular block on one side wall of the apparatus and an adjustable triangular block on the opposite side wall. The opposed side walls of the blocks forming the restricted section of the apparatus are not parallel so that a mere restricted orifice instead of a constant cross sectional area scrubbing throat is provided.

FIG. 3 of the aforesaid Erni patent shows a venturi having conical side walls and a double cone, moveable insert. No specific relative dimensions of the venturi throat and major diameter of the insert are described and due to the fact that the parts are conical (of circular cross section) the resultant scrubbing throat has a constantly increasing cross sectional area.

The United States patent to Ueda U.S. Pat. No. 3,556,489, Jan. 19, 1971, shows a wet type gas scrubber having a rectangular cross section venturi with a restricted throat of substantial axial length. Disposed in the throat is an elliptical insert restriction of variable width but the resultant flow passage throats are not of constant cross sectional area. As seen in the diagram on FIGS. 8 and 9 of this patent, a substantial amount of nonrecoverable pressure drop is required to move the gas through this device. This results from the discontinuities in the insert in the throat and the turbulent losses associated with them. This non-recoverable pressure drop in Ueda represents a loss of energy and increased horsepower requirements for the fan or blower that forces the gas through the device.

The United States patent to Willett, U.S. Pat. No. 3,544,086, Dec. 1, 1970, shows a converging conical nozzle in which is adjustably mounted a double conical insert. The resultant conical throat area decreases in cross section until the gas discharges from the throat in what amounts to a simple orifice. Thus the gas discharges from the circular throat orifice into a low velocity chamber. There is no expander and no recovery of pressure with savings in the induction energy requirements.

The Unites States patent to Hausberg, U.S. Pat. No. 3,199,267 Aug. 10, 1965 shows a conical venturi passage with a double conical insert in the expander portion of the passage. The scrubbing throat has a progressively increasing cross sectional area and there is no pressure recovery zone at the discharge for economizing in induction power.

The United States patent to Simizu, U.S. Pat. No. 3,503,028, Mar. 24, 1970, shows a conical venturi passage with a long restricted throat and with an open conical insert shell. The shell is partially in the inlet to the venturi throat and partially in the throat itself in its lowermost position and completely out of the throat in its uppermost position. In the lowermost position, the gas flows primarily through the insert which thereby acts as a single orifice. In other positions, the gas flows both through and around the insert before reaching the venturi throat and no constant cross sectional area passage is provided.

The United States patent to Dell'Agenese, U.S. Pat. No. 3,517,485, June 30, 1970, shows a conical venturi passage with a restricted throat of substantial length and a cone disposed in the exit passage of the venturi, below the throat. Water is injected beneath the cone. There is no teaching of how to provide a scrubbing throat of substantial length that has a constant cross sectional area along its length. In fact, the end of the cone and the diverging venturi wall form a simple orifice.

The United States patent to Lorraine et al, U.S. Pat. No. 147,460, Oct. 9, 1923, shows an adjustable flow nipple for oil wells wherein a tapered restrictor slides in a correspondingly tapered orifice in an oil line insert. There is no teaching of a venturi scrubber construction wherein the ratio of the width of the scrubbing throat to its length is constant throughout the range of adjustment of an insert in the venturi.

SUMMARY OF THE INVENTION

The apparatus of the present invention will be explained in connection with an installation for the scrubbing of flue or stack gases or the like to remove and collect particles, dust, etc. from the gas flow, using water in a gas-liquid contact system. However, it will be understood that the general principles of the apparatus to be described in detail can be applied to other gas-liquid contact apparatus.

One of the principle features of the present invention is the provision of a pair of relatively long scrubbing throats wherein the gas flows at a relatively high velocity in the presence of substantially atomized liquid, such as water, for providing a relatively long and effective contact path between the dust or other particles and the liquid, thereby producing a high collection or scrubbing efficiency. Although the aforesaid relatively long scrubbing throats diverge, it is a feature of the invention that they have a constant cross-sectonal area along their length.

Another feature of the present invention resides in provision of an adjustable venturi insert which provides the aforesaid pair of relatively long throats of constant cross sectional area, these throats having a constant ratio of width to length throughout the range of insert adjustment. It has been found that holding of the aforesaid ratio of width to length at some predetermined constant facilitates a design which minimizes variations in the frictional losses that occur in the throats for various gas flow rates encountered, while maintaining optimum scrubbing velocities.

Another feature of the present invention is the minimizing of power losses in the scrubber, that is in minimizing the amount of energy required to accelerate the gas flow through the scrubber, throughout the range of adjustment of the aforesaid insert, while providing a scrubbing and particulate removal action that is superior to that of prior devices.

Briefly, the aforesaid features and advantages are attained under the present invention by providing a venturi passage having a rectangular cross-section. This passage has converging-diverging side walls that join to form a minimum area throat or restriction, which is also of rectangular cross section. Within the venturi passage is what will be termed a "double diamond" insert, which in the form illustrated has diverging-converging side walls that are joined at a rectangular restriction representing the major cross sectional area of the insert. The other walls of this insert, which will be termed edge walls, are flat or straight and slidably fit the edge walls of the venturi passage, so that the gas flow occurs between the side walls of the venturi passage and insert.

The width of the major section or restriction portion of the double diamond insert is equal to the width of the restricted throat of the venturi passage, and the latter is very short and in fact, is preferably substantially contained in a plane. The angle of divergence of the diverging portions of the venturi passage is equal to the angle of divergence of the diverging side walls of the insert, and the latter are positioned in the diverging portion passage of the venturi passage, thus forming two parallel wall throats. The included angle between the converging side walls of the insert and the diverging side walls of the venturi (which can be referred to as the expander) remains the same throughout the range of insert adjustment.

Long scrubbing throats of maximum width are provided when the insert is positioned in the venturi passage so that the apex of the diverging walls lies in the plane of the venturi throat restriction. This provides two diverging scrubbing throats of constant width and hence of constant cross sectional area along their length. In this specificaion and in the appended claims, when referring to the scrubbing throats the term "cross sectional area" refers to a section that is perpendicular to the longitudinal axis of the scrubber. With the aforesaid geometry, the insert can be adjusted to accommodate various gas flow rates while maintaining selected scrubbing velocities. With maximum flow rate, the insert may be lowered to its fully open position, or the insert may be raised to a position more effective for a reduced flow rate. In the latter case the insert is raised, so that its maximum dimension or restriction approaches the venturi passage throat or restriction. With the aforesaid geometry, regardless of the adjusted position of the insert within the operating limits, the ratio of the width of each scrubbing throat formed by the insert to the depth of the throat remains constant throughout the range of adjustment. In operation, the converging venturi inlet passage accelerates the gas, utilizing power most of which can be recovered in the expander section, and the gas reaches maximum velocity in the diverging pair of constant cross sectional area scrubbing throats without the introduction of power consuming turbulence other than the turbulent mixing of liquid and gas resulting from the high velocity in the throats. These throats provide a relatively long path for water contact and particulate collection.

The scrubbing liquid, such as water, is introduced above the venturi throat and is atomized during the passage of the gas through the relatively long, diverging constant cross sectional area scrubbing throats formed between the diverging wall portions of the insert and the diverging side walls of the exit passage of the venturi. It has been found that with flow rates normally encountered in this service, liquid atomizing type nozzles are not required at the liquid spray pipes. It is sufficient to merely introduce liquid into the relativley high velocity air stream in the inlet passage of the venturi, thus forming droplets without requiring the use of high pressure pumps for the liquid. Some of the liquid droplets impinge upon the side walls of the venturi inlet and upon the upper portion of the inlet. The liquid is further atomized and sheared off at the venturi throat restriction and along the diverging, constant cross sectional area scrubbing throats. This atomization of the liquid, coupled with the relatively long length of the scrubbing throats, (and the resultant relatively long length of the turbulent mixing zone), provides a high collection effeciency. When the gas leaves the diverging scrubbing throats, it enters two gradually expanding passages so that pressure is recovered as velocity is reduced gradually, thereby minimizing the energy consumption to cause the gas to flow through the scrubber.

The advantages of the present invention can be obtained for a specific installation by designing the over all dimensions of the venturi and the insert to achieve a desired fixed flow rate through the constant cross sectional area scrubbing throats. On the other hand the installation lends itself to adjustment of the insert within the venturi passage for accommodating the apparatus to various changes in initial flow rates encountered in service.

These adjustments do not effect the collection efficiency and do not increase the frictional losses in the scrubbing throats, nor do the adjustments increase any turbulent losses that might occur in the expander. In fact, if a unit is designed to efficiently handle a maximum flow rate wide open, and a lesser flow rate is encountered, closing the insert for optimum scrubbing will result in a decrease in frictional losses due to the design and principles of the unit.

Another feature of the present invention is that it teaches how to determine a practical ratio between the width across the elongated scrubbing throats and their depth, which provides good compromiss between minimizing frictional losses, insuring adequate atomization and scrubbing action by the water introduced into the apparatus, without producing a unit that is excessively narrow and deep. In accordance with the present invention, this ratio of throat depth to throat width will vary from a value not substantially less than one, to a more normal value of four, but this ratio may be eight or higher. However, ratios much higher then eight (when measured with the insert fully open) result in a rather narrow and deep apparatus, which requires a more complex transition to the ordinary inlet and outlet ducting of approximately square or somewhat rectangular cross sectional configuration.

SYSTEM EMBODYING THE INVENTION

Figure 1:
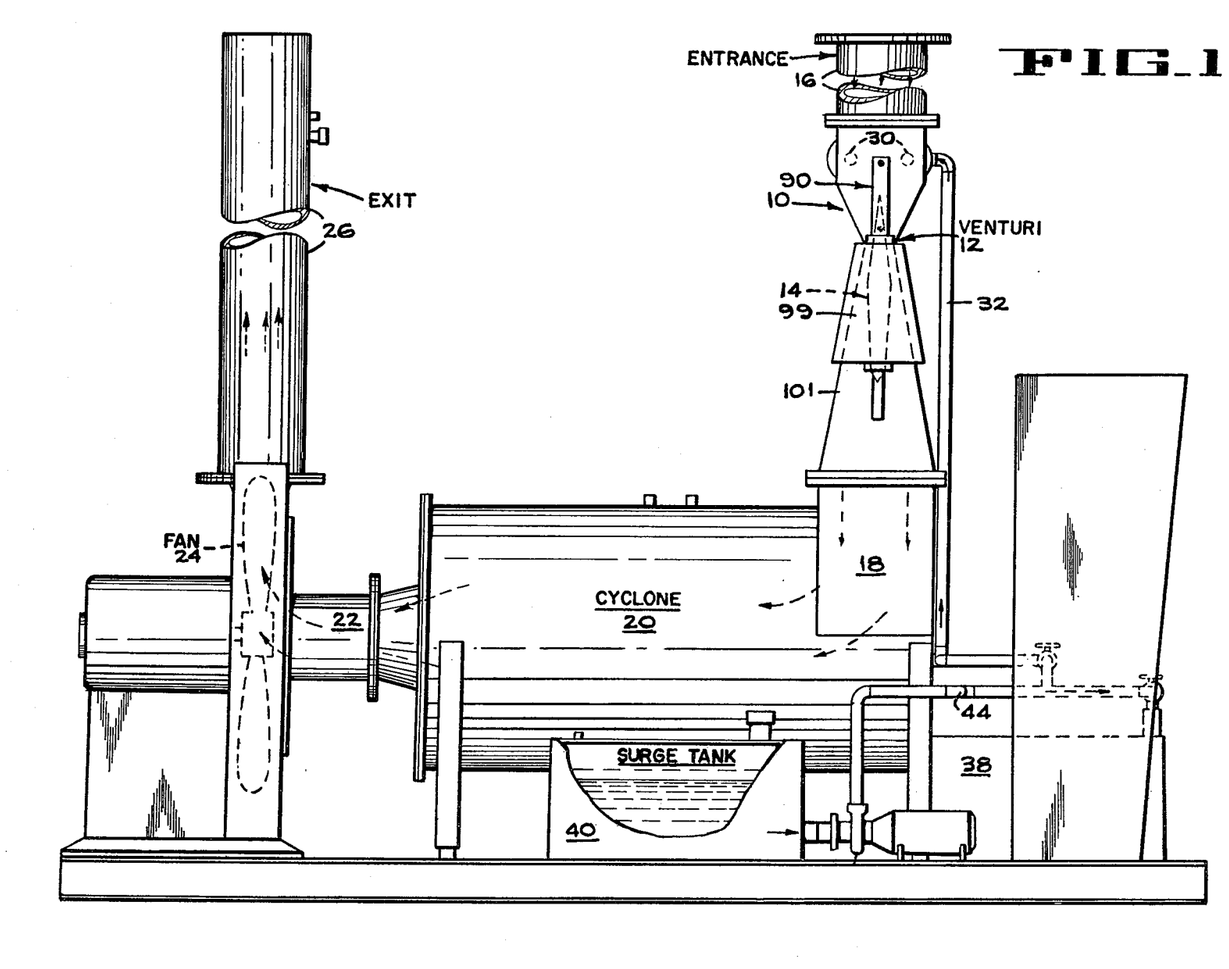
FIG. 1 is a side elevation of a scrubber system embodying the present invention.
Figure 2:
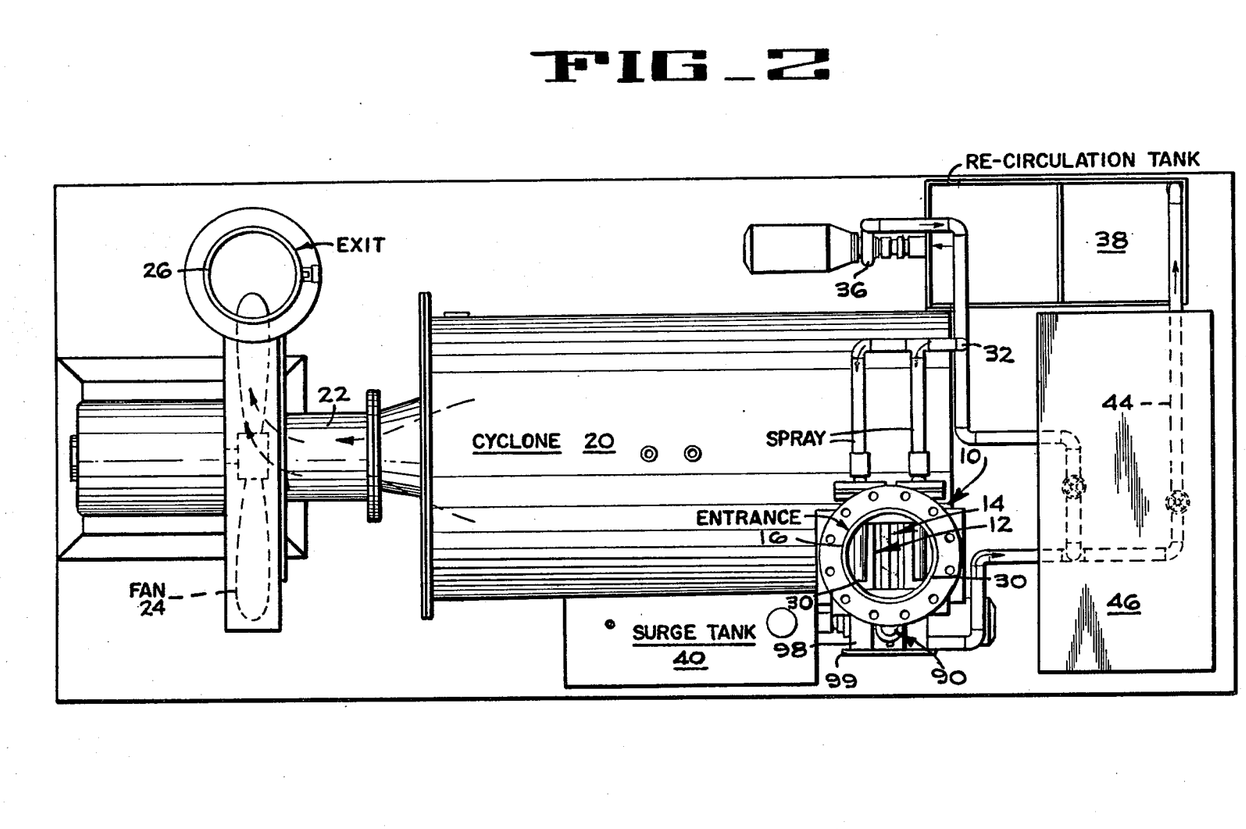
FIG. 2 is a plan of the system.

FIGS. 1 and 2 illustrate, by way of example only, a scrubbing system for flue gases or the like embodying the present invention. In these diagrams the venturi assembly of the present invention is indicated generally at 10 and includes a venturi passage 12 with double diamond insert 14 disposed therein. The construction of the venturi assembly 10 is best shown and will be described in detail in connection with FIGS. 3 – 8.

Referring to the overall layout of the system shown in FIGS. 1 and 2, the gases to be scrubbed enter a duct 16 which is bolted to the venturi passage 12. Perforated pipes 30 (FIGS. 3 and 8) introduce the scrubbing water. The outlet of the venturi 12 directs the gases, which now incorporate the water that has been introduced into the venturi and has picked up particles of dust or the like, through an exit duct 18 and on to a cyclone separator 20. The cyclone 20 is of the usual tangential inlet type well known in the art, the details of which are not critical to the present invention. The scrubbed gases leave the cyclone 20 by means of an exit duct 22 and the gases are pulled through the system by a fan 24 of conventional design. The fan blows the scrubbed gases out of an exit duct 26 usually for release to the atmosphere.

As mentioned, water is sprayed into the inlet passage of the venturi 12 by means of spray pipes 30 (FIG. 8) which are connected to a water delivery pipe 32 (FIG. 4) leading from a pump 36. The pump 36 draws water from a recirculation tank 38.

In the cyclone 20 the water and entrained particles are separated from the gases flowing through the cyclone and dropped through the bottom of the cyclone. The water is picked up in a manner conventional in the art by a surge tank 40 (FIG. 1) and the slurry of water and particles is pumped from the surge tank by means of a pump 42 (FIG. 1) through a pipe 44 back to the venturi directly or to a recirculation tank 38 (FIG. 2) where chemical treatment can be performed or additional particles can be removed. By means well known in the art, the dust particles are allowed to settle out from the water in the surge and recirculation tanks. Clarified water is thus recirculated by means of the pump 36 back into spray pipes 30, as previously described.

A control and indicator panel 46 is illustrated in FIGS. 1 and 2 but the connections and instruments thereon are not illustrated because these are conventional in installations of this type. These instruments include various flow meters and pressure measuring devices connected to various parts of the unit to monitor the operation thereof. The various pipes, etc. shown in the diagrams in FIGS. 1 and 2 actually enter the control panel for control and monitoring purposes, but these details represent conventional engineering that are not critical to the present invention.

Construction of the Venturi Assembly

Figure 3:
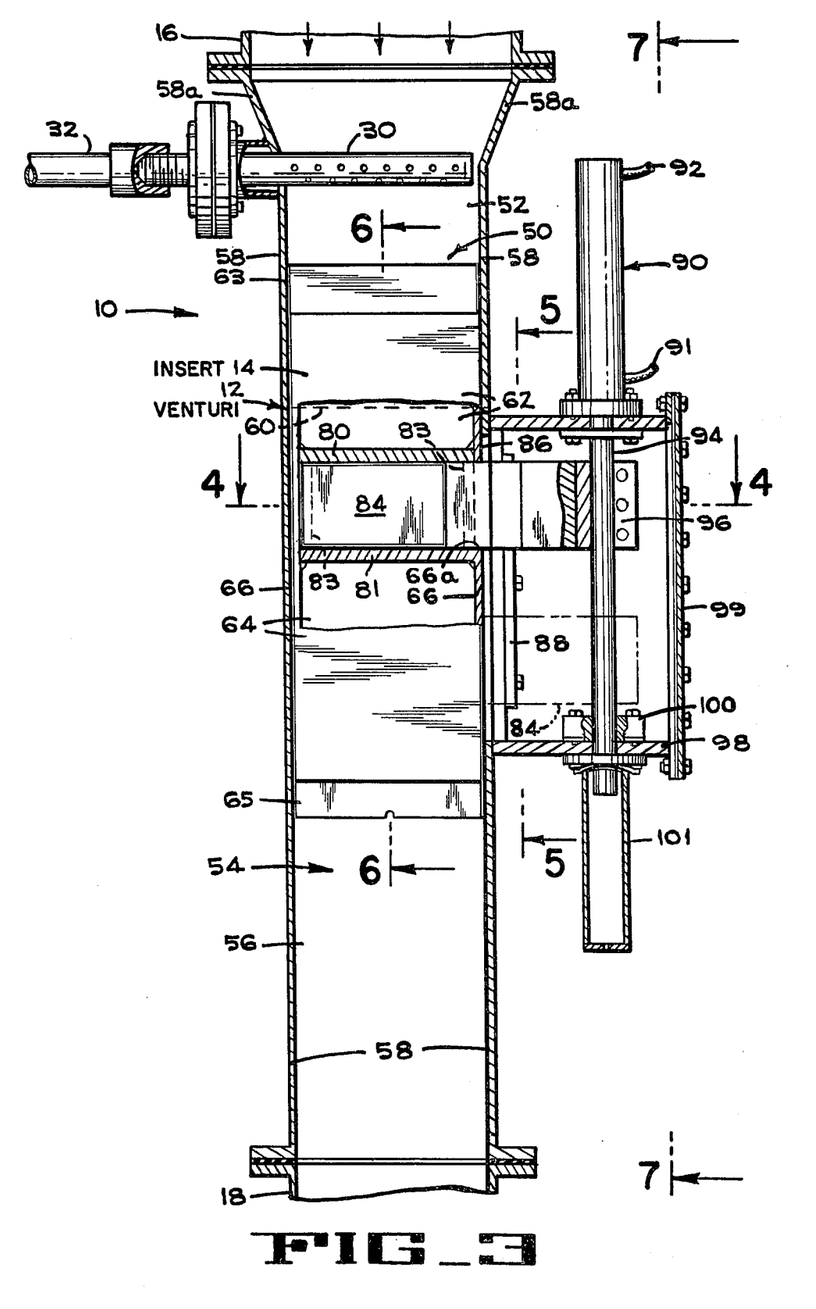
FIG. 3 is a side view of a venturi assembly embodying the present invention with parts broken away.
Figure 6:
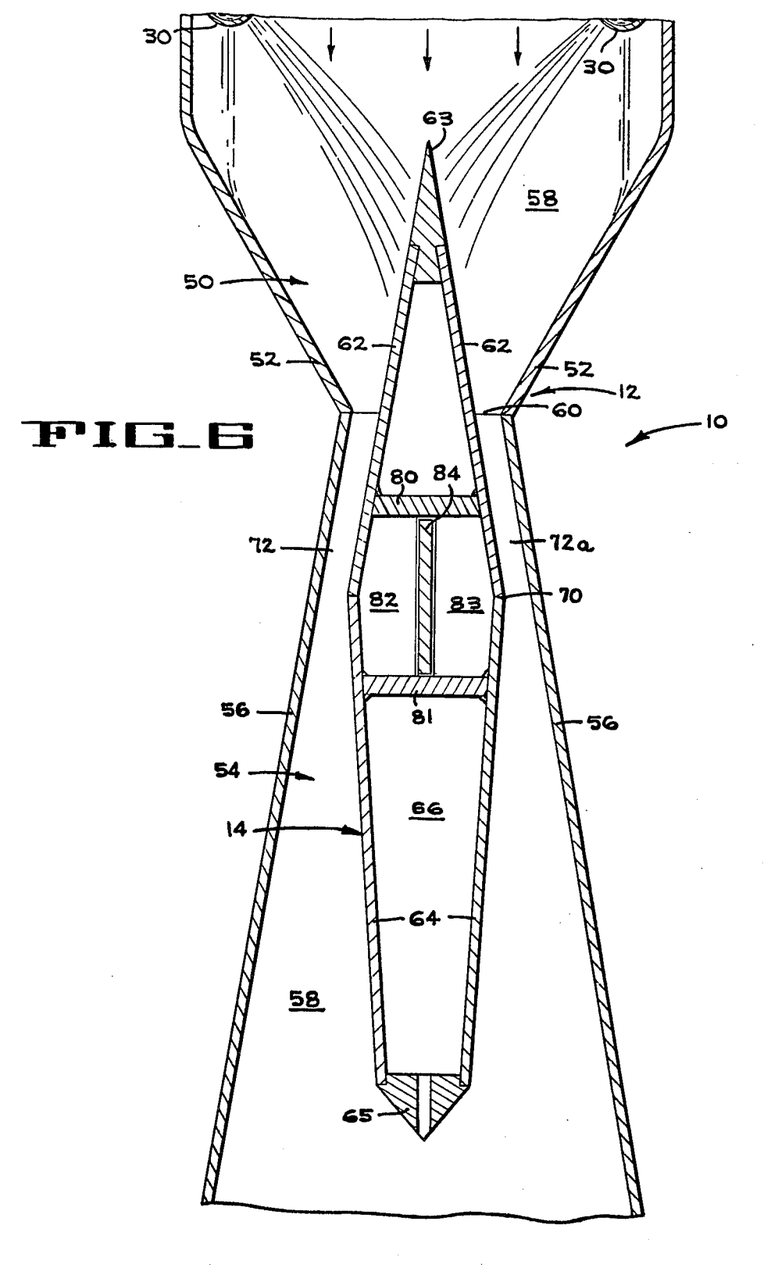
Figure 7:
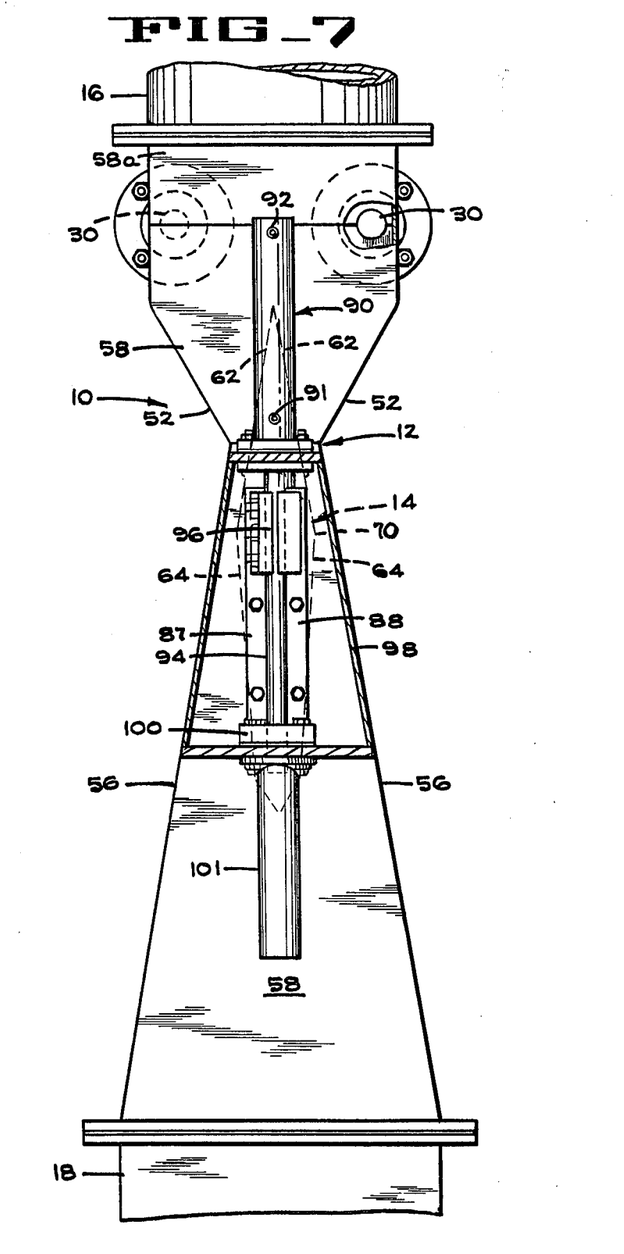
Figure 8:
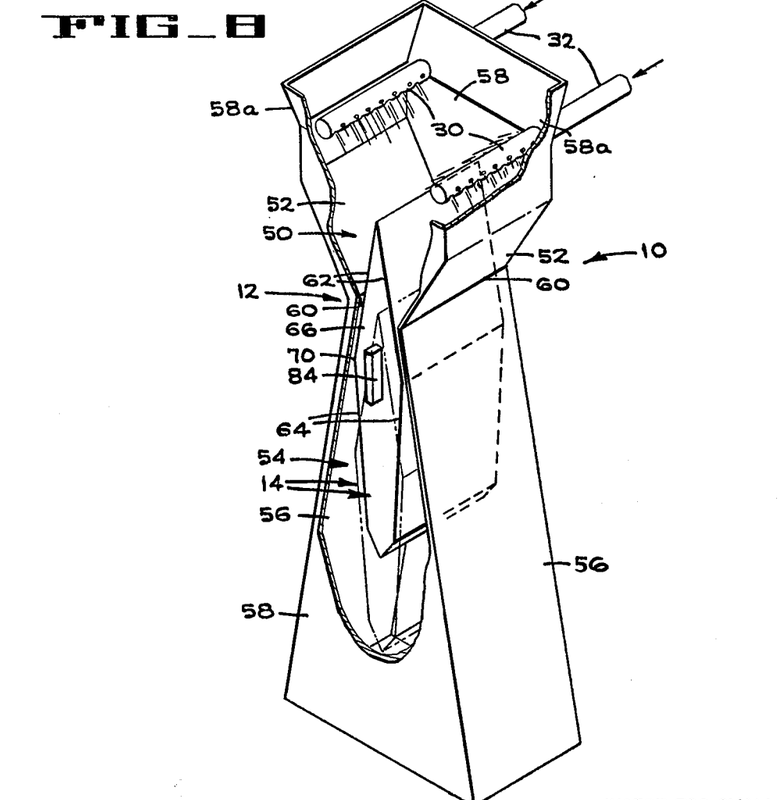
FIG. 8 is a diagrammatic perspective of the venturi assembly of the present invention where the insert is shown in solid lines in its upper position and in broken lines in its open position.

Referring to FIGS. 3 – 8, the venturi assembly 10 of the present invention includes a rectangular section venturi passage 12 having diverging-converging side walls that join to form a minimum area restriction. A rectangular double diamond insert 14 of complimentary configuration is adjustably mounted in the venturi passage 12. As seen in FIG. 6, the venturi 12 has an inlet passage 50 formed with converging sidewalls 52 and an outlet passage or expander 54 having diverging side walls 56. The flat or straight edge walls 58 of the venturi are welded to the converging-diverging side walls 52,56 to form a rectangular venturi passage. The straight edge walls 58 are best seen in FIGS. 3 and 8.

The water spray pipes 30, previously described, project into the venturi just above the entrance throat 50, as seen in FIGS. 3 and 8. In order to provide a connection to the inlet duct 16 (FIGS. 3 and 7), the edge walls 58 of the venturi 12 diverge at 58a (FIG. 3).

The converging side walls 52 and the diverging side walls 56 of the venturi join to form a rectangular restriction 60 (FIGS. 6 and 8) and it will be noted that this restriction is very short and in fact lies in a plane in the preferred embodiment.

The Insert

Figure 4:
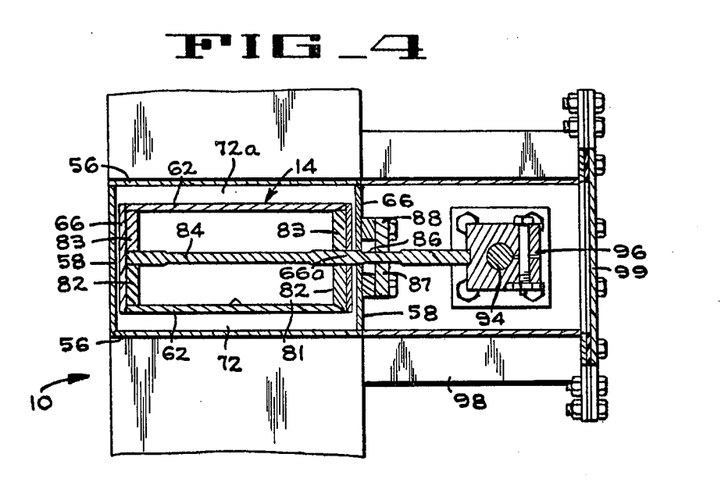
FIGS. 4, 5 6 and 7 are sections taken as indicated on FIG. 3.
Figure 5:
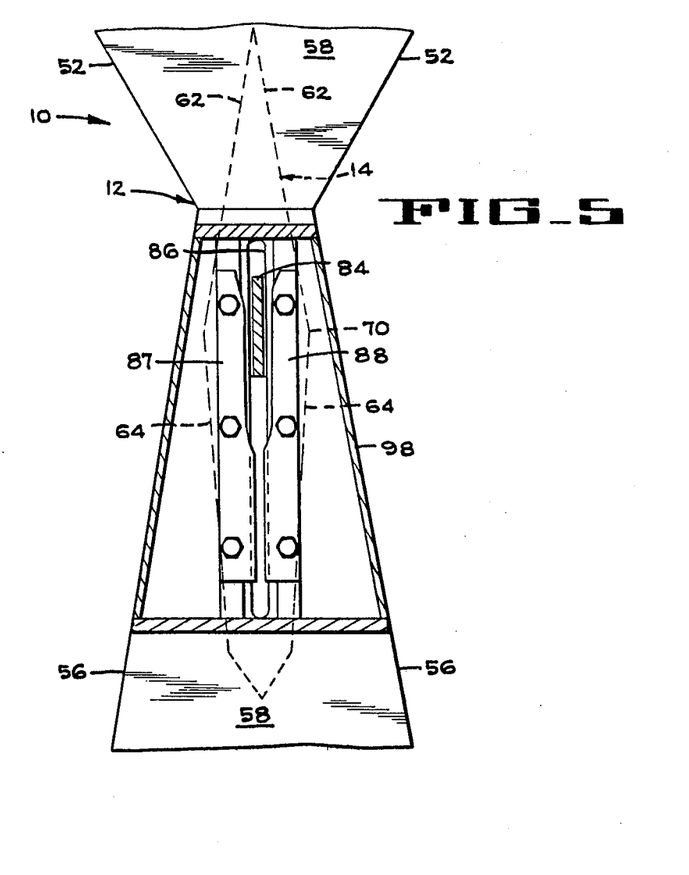

The insert 14, which has been referred to as a double diamond insert, has a special geometrical construction relative to the dimensions of the venturi 12 in accordance with the present invention. The insert is rectangular in section and is slidably received between straight edge walls 58 of the venturi, as best seen in FIGS. 3 and 4.

The insert has diverging, flow dividing side walls 62 (FIG. 6) joined by a cap member 63 that forms the smooth continuation to the upper edge of the insert. The insert has downstream converging sidewalls 64 which form interior obtuse angles with the sidewalls 62 closed by a cap member 65. The walls 64 need not continue to a line junction as in the case of the flow dividing walls 62, because by the time the gases have reached the lower end of the insert their velocity is so low that it will have been reduced to the point wherein further controlled expansion is not required.

The insert is of rectangular cross sectional shape throughout its length and is closed at its edges by straight edge walls 66 best seen in FIGS. 3 and 8.

The diverging side walls 62 of the insert join the converging side wall 64 of the insert to form a maximum width, rectangular restriction indicated at 70. The edge walls 66 of the insert slidingly engage the edge walls 58 of the venturi so that essentially all of the gas must flow between the side walls of the venturi and the side walls of the insert. As best seen in FIG. 6 and in the diagram of FIG. 12, the diverging side walls 62 of the insert are parallel to the diverging side walls 56 of the venturi passage and thus form a pair of diverging, constant cross section throats indicated at 72, 72a. For reasons to be described in detail presently, the width of the major restriction 70 of the insert is equal to the width of the restriction 60 forming the throat of the venturi 12.

Insert Adjustment Mechanism

Figure 12:
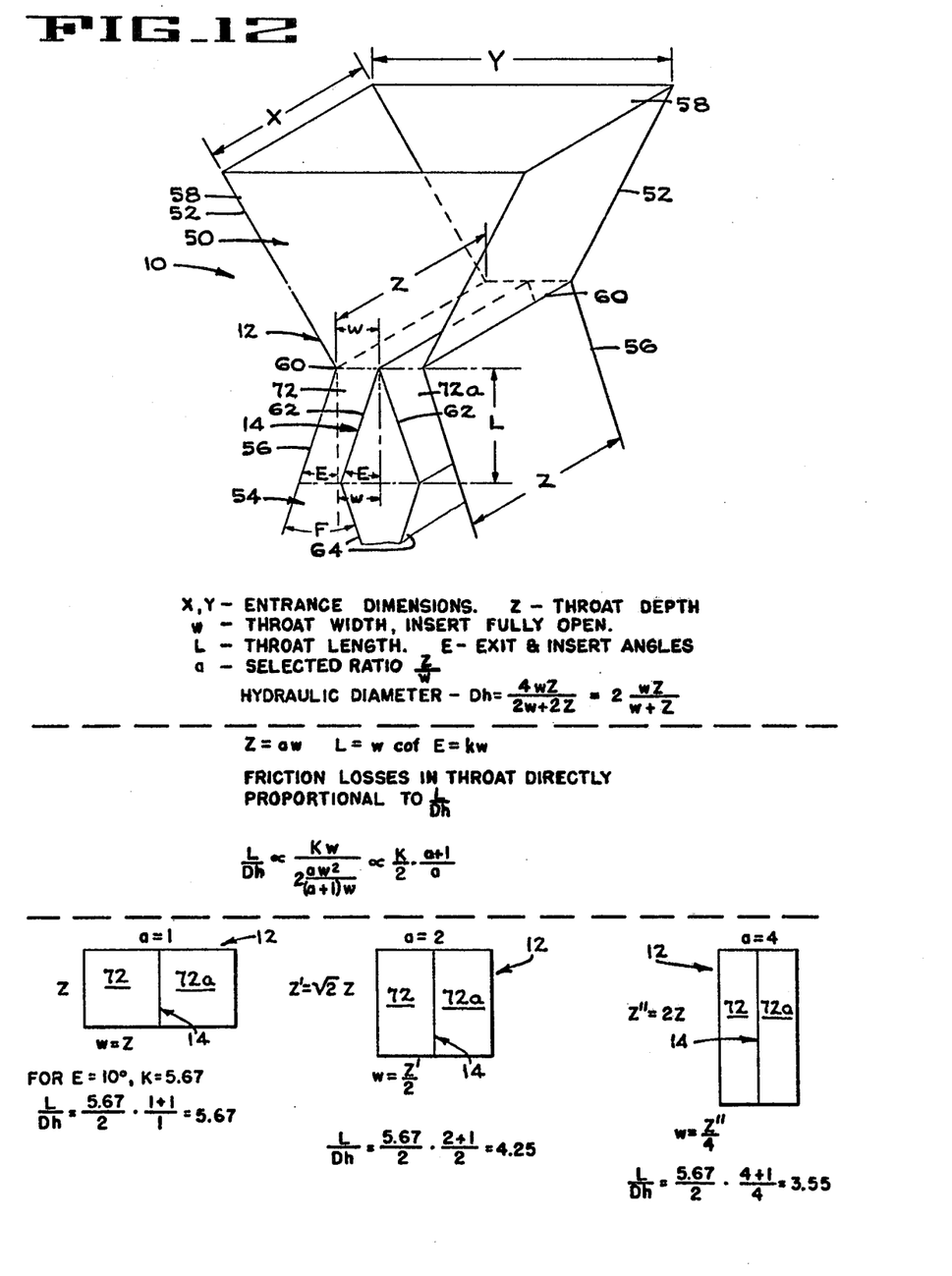
FIG. 12 is a schematic diagram of the assembly of the present invention including factors for various design equations as well as showing three representative configurations of the venturi.

The insert 14 is adjustable in the venturi passage 12 from an uppermost position wherein the insert restriction 70 approaches the venturi restriction 60 (dotted lines in FIG. 9) to a lowermost, or fully open position wherein the apex of the insert is in the plane of the venturi restriction 60, as shown in dotted lines of FiG. 8 and in the schematic diagram of FIG. 12.

The adjusting mechanism, in the illustrated embodiment, is in the form of an externally mounted pneumatic or hydraulic cylinder connected to a lifter bar that projects into the mid-portion of the insert 14 through a slot in one of the edge walls 58 of the venturi 14.

Details of the adjustment mechanism are shown in FIGS. 3 - 7. The interior of the insert is formed with upper and lower plates 80,81 and two pairs of lifter arm locating plates 82,83 (FIG. 6). One of the edge walls 66 of the insert is apertured at 66a to receive a lifter arm, 84, best seen in FIG. 3. As mentioned, one of the edge plates 58 of the venturi is slotted at 86 (FIGS. 4 and 5) to accommodate vertical motion of the insert lifter arm 84. Guides 87,88 (FIGS. 4 and 5) are bolted to the slotted venturi edge plate 58 to accurately align and center the insert in the venturi passage at all adjusted positions of the insert.

The insert lifter arm 84 is operated by a linear actuator in the form of a fluid piston and cylinder assembly 90 best seen in FIG. 7 which has a piston raising connection 91 and a piston lowering connection 92. These connections conduct fluid under pressure and are controlled by suitable valves and flow control devices (not shown) which make it possible to position the insert 14 in the selected vertical location within the venturi passage.

The piston rod 94 of the linear actuator 90 is clamped at 96 to the projecting end of the insert lifting arm 84, which clamp best appears in FIGS. 3 and 4. The lifting mechanism is sealed to the interior of the venturi passage by means of a box 98 secured to the edge wall 58 of the venturi passage (FIGS. 3 and 4) and closed by a cover plate 99. The box has a guide 100 which includes a fluid seal for the lower end of the piston rod 94. A guard 101 encases the rod in its lowermost position and prevents injury to operating personnel. The uppermost position of the lifter arm 84 is shown in solid lines in FIG. 3 and the lowermost position is shown in dotted lines in that figure.

Thus by controlling the fluid emitted to one or the other of lines 91,92 for the linear actuator 90, the insert will be adjustably positioned within the venturi passage while retaining precise alignment of the insert axis with the venturi axis. This assures that the throats 72,72a (FIG. 6) will be of the same size and geometrically congruent.

Operational Features and Characteristics

In addition to the construction of the venturi of the present invention, wherein the scrubbing throats 72,72a (FIG. 6) have a constant cross sectional area throughout their length, when the insert is adjustable, as in the preferred embodiment, although the cross sectional areas change as the insert is moved, the areas remain constant throughout their length at every operable position of the insert.

Another feature of the present invention resides in certain dimensional relationships of each throat 72,72a over all ranges of insert adjustment. To explain this and first referring to the diagram of FIG. 12, the angle of divergence E of the diverging side walls 62 of the insert relative to its axis is equal to the angle of divergence of the exit passageway side walls 56 of the venturi. Stated differently the aforestated insert and venturi passage side walls are parallel throughout the length of the throats 72,72a.

As has been previously stated, it is important that the major restriction 70 of the insert 14 be of the same size as the throat restriction 60 of the venturi 12. This construction, in combination with the equality of angles previously described, is a feature which provides the relationships shown in the diagram of FIG. 9.

Figures 9, 10:
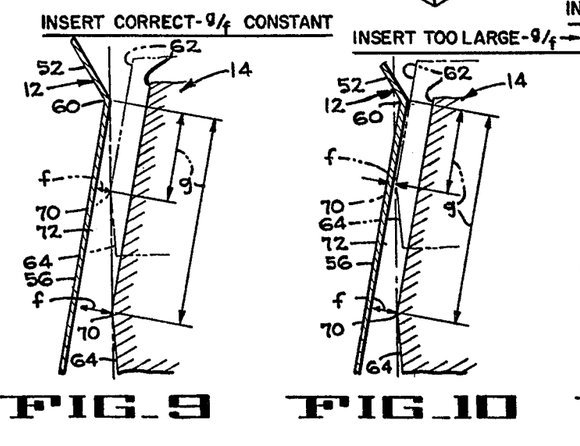
FIGS. 9, 10 and 11 are diagrams illustrating geometric principles of the invention.

In FIG. 9, the insert 14 is shown in a lowered position in solid lines and a higher position in broken lines. One of the throats 72 is also shown. The length of the scrubbing throat 72, in the sense in which it is measured in FIG. 9, is designated at $g$ and represents the distance along the side wall of the venturi between the venturi throat restriction 60 and the insert restriction 70. The width $f$ of the throat 72, as measured in FIG. 9, is the distance perpendicular to the side wall 56, and is indicated for the two positions of the insert. With the parts designed in accordance with the present invention, wherein the dimensions of the restrictions 60 and 70 are the same, it can be shown that the ratio of the throat length $g$ to the throat width $f$ is constant at all useable positions of the insert. This feature is important in that it maintains preselected operating conditions at all adjustments of the insert, the adjustments being made to provide a preselected velocity through the throats 70,72 for various flow rates of gases introduced into the scrubber.

FIG. 10 is a diagram like that of FIG. 9 illustrating a condition wherein the insert restriction 70 is too large (under the principles of the present invention) relative to the venturi restriction 60. Here, as the insert is raised from an open toward a closed position, the aforesaid ratio of throat length $g$ to throat width $f$ approaches infinity, thereby providing variable operating conditions instead of making it possible for pre-selected operating conditions through the throats 72, 72a.

Figure 11:
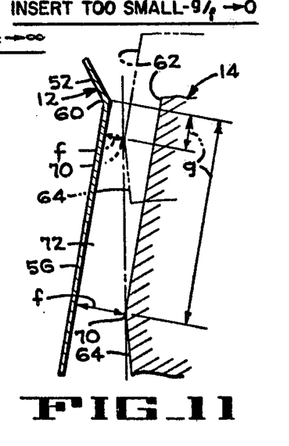

The diagram of FIG. 11 is another diagram like those of FIGS. 9 and 10 but in FIG. 11, the insert restriction 70 is made too small relative to the throat restriction 60. Here, as the insert is raised from an open to a closed position, the ratio of throat length $g$ to throat width $f$ approaches zero. Thus, only a venturi assembly designed in accordance with the present invention and illustrated in principle in FIG. 9 will have the constant throat length to width ratio that forms an important feature of the present invention in an adjustable insert installation.

The diagram of FIG. 12 and the data associated therewith display the geometrical characteristics of the venturi of the present invention previously described in connection with FIG. 9 and also present additional features and operational characteristics of the apparatus. Referring to the diagram of FIG. 12, the venturi inlet indicated generally at 50 is assumed to have a width Y and a depth X. These dimensions must be accommodated to the ducting leading into the venturi 12. In the diagram, the depth Z of the restriction 60 equals the depth X of the inlet 50 but this is not necessarily the case for the full extent of the inlet 50. The width $w$ of the throats 72,72a is assumed to be that present when the insert 14 is at its fully opened position with its apex lying in the plane of the venturi restriction 60. Of course, as the insert is moved up through the venturi restriction 60, the width $w$ will progressively decrease. In the diagram of FIG. 12, the length L of the throats 72,72a is measured along the axis of the parts. In designing the assembly 10 of the present invention and in accordance with the principles described, a selected ratio between the depth Z and throat width $w$ must be decided upon, which ratio is designated as the ratio $a$. An important consideration in the design of the venturi scrubber is the minimization of frictional and turbulent losses that do not enhance scrubbing, including frictional losses in the scrubber throats 72,72a. A further important consideration is that, for an adjustable venturi throat, the aforesaid losses do not increase as the throat is closed. In accordance with the present invention, these losses are small, and the geometry of the parts is such that they are even reduced somewhat as the cross sectional areas of the throats 72,72a are reduced by closing adjustment of the insert.

In the range of normal operating conditions, the frictional losses in the throats 72,72a are directly proportional to the dimensionless number $L/D_h$, which is the throat length L divided by the "Hydraulic Diameter" $D_h$. The figure $D_h$ is equal to four times the throat cross section divided by the wetted perimeter of the throat and these terms are shown in the formula for $D_h$ in FIG. 12. If properly designed, the frictional losses in the rectangular throats do not greatly exceed those of the ideal circular throats wherein the Hydraulic Diameter is equal to the diameter of the circular throat.

As indicated in FIG. 12, since the ratio $a$ equals $Z/w$, the depth Z of the venturi (and of the insert) is equal to the ratio $a$ multiplied by the throat width $w$. Also the throat length L, with a given angle E and a given width $w$ can be expressed in terms of the throat width $w$ and the cotangent of the angle E, which is equal to a constant K multiplied by the width $w$.

The friction losses in the throats 72,72a are directly proportional to the throat length L divided by the hydraulic diameter $D_h$. As shown in FIG. 12 the aforesaid expression is equal to the constant K/2 times the quantity $(a + 1)/a$, where $a$ is the aforesaid ratio $Z/w$. Thus the friction losses for a given design are determined principally by the aforesaid ratio $a$ of throat depth to throat width. Of course, if the insert is in a fixed, fully lowered position as shown in the diagram of FIG. 12, the friction losses will not vary with a given flow rate but on the other hand if the insert is raised in the adjustable embodiment of the invention this will progressively decrease the throat width $w$ and hence will increase the ratio $a$.

The minimum practical ratio $a$ is that provided by a square throat 72 or 72a, wherein $w = Z$ so that $a = 1$ to 1. With a ratio $a$ of any less than 1 to 1, difficulty is encountered in distributing the water effectively over the wetted surfaces of the throats for providing optimum atomization of the water.

It can be seen from inspection of the formulas that as the ratio $a$ is increased, the frictional losses proportional to $L/D_h$ decrease because the expression $L/D_h \alpha (a+1)a$ will vary from a value of K for a square throat ($a = 1$) to a value approaching K/2, as the ratio $a$ approaches infinity. Thus it would appear that a thin, deep design would be selected.

Practical considerations, however, limit the degree to which the ratio $a$ can be increased (with the insert wide open) in order to decrease frictional losses proportional to the factor $L/D_h$. The three diagrams at the bottom of FIG. 12 are exemplary. The first diagram shows a square throat that is, $a = 1$ to 1 wherein the throat width $w$ equals throat depth Z. For a divergence angle E of 10° the constant K in the formula equals 5.67. With $a$ equal to 1 to 1, friction loss figure $L/D_h$ is proportional to 5.67. The resultant shape of the restriction 60 is rectangular, but its long dimension is somewhat too large for connection to conventionally shaped inlet ducts. It will be noted that the diverging entrance walls 52 will exaggerate the rectangularity of the inlet dimensions X, Y. Also, this design may present water distribution problems.

In the next example the ratio $a$ is equal to 2 to 1. For ease of comparison, this example is drawn, so that the throats 72,72a have the same area as the throats 72,72a of the first example. Now the restriction 60 is more nearly square, but will be more rectangular at the entrance X, Y because of the walls 52 diverging from the dimension Z. However, this is a better design for ducting than that of the first example. In this second example, and with a ratio $a$ of 2 to 1, the throat width $w$ is half that of the throat depth Z'. Since the areas of all examples are assumed to be equal, the depth Z' in the second example is now 1.414 times the depth Z of the first example, with which the actual area of restriction 60 will remain the same as before, for visual comparison. In the second example, the friction loss factor $L/D_h$ will be equal to 4.25 and is thus somewhat less than that of the square throat design.

The third example, where $a = 4$ to 1, gives a much flatter and deeper venturi restriction 60 for the same throat area. However, due to the divergence of the entrance walls 52, the duct connection X,Y will be almost square. In the second example, the friction loss factor is still further reduced and is equal to approximately 3.55.

As the ratio $a$ is further increased, the apparatus becomes deeper and thinner for a given throat area, which, from a practical standpoint, begins to complicate the connection of the venturi entrance X, Y, to a normal square or somewhat rectangular inlet duct. Thus, for all practical purposes a value of $a = 8$ to 1 is about as high as will normally be encountered.

It is common practice to cause a reduction in area of the venturi inlet 50, shown in the top of diagram on FIG. 12, of about 2 to 1. As mentioned, with a divergence of the venturi inlet walls 52 that produces this 2 to 1 reduction, if a ratio $a$ is selected equal to 4 to 1, the inlet dimension ratio of X to Y will approach 1, which will simplify connection to a square duct. However, rectangular ducts are also conventional and these can readily be connected to venturis where $a = 4$ to 1. Higher ratios of $a$ simply require more complex adaptors to normally shaped rectangular ducts.

As previously mentioned, the diagram of FIG. 12 shows conditions when the insert is at its fully opened position. In any one design it will be understood that the ratio $a$ increases as the insert is closed, thereby reducing the width $w$ of the throats 72,72a and decreasing the fractional losses in the throats.

Operation

The operation of the venturi of the present invention will be described briefly. The gas is drawn down through the inlet 50 by the fan 24 (FIG. 1) and since the side walls 52 of the inlet converge, the gas velocity progressively increases, reaching its maximum at the venturi restriction 60. After the restriction 60, the gas is confined in the throats 72,72a between the parallel venturi side walls 56 and the side walls 64 of the insert. The water which has been introduced in from the perforated pipes 30 and which need not have been atomized by those pipes, impinges upon the side walls 52 and 62 of the venturi and the insert and works its way down into the restriction 60. At the restriction 60, the water is sheared off the side walls and insert by the accelerated gas mass and is atomized in the throats 72,72a whereupon the water captures dust and other particles. The fact that these throats are of considerable length gives ample time for the mixing and scrubbing and precipitating action. There are no sharp edges or contours through the throats 72,72a which would require additional power consumption for the fan that propels the gas through the assembly.

After leaving the throats 72,72a, the gases pass into gentle expansion chambers defined by the converging side walls 64 of the insert and the diverging side walls 56 of the venturi, which will have an included angle not exceeding 20°, whereby the velocity of the gas and water-entrained particles is progressively reduced, restoring potential energy to the gas. As previously mentioned, the lower cap 65 for the insert does not disturb the gentle expansion during exit of the gas from the venturi because the velocity will have been reduced to substantially that of the major exit passage of the venturi at this zone.

If the insert is raised, with a given gas input, the velocity in the throats 72,72a will be correspondingly increased while the required energy input and the scrubbing efficiency will also increase. Usually, however, the insert will only be raised if the air flow rate is decreased, and vice versa.

Design Example

By way of example, critical dimensions and factors will be given for a typical but relatively small venturi scrubber design embodying the invention.

Air Flow Rate — 3,500 cubic ft./min. maximum
Scrubbing Liquid Rate — 5 - 30 Gals/1,000 cubic ft. of air.
Pressure Drop — Variable from about 10 inches of water gauge to 70 inches water gauge at the venturi restriction, depending on the insert position.
Velocity at Throats 72,72a — variable from about 100 ft./sec. to 450 ft./sec.

Refer to FIG. 12

Throat depth Z — 9.0 inches.
Throat width and insert width $w$ — 2.0 inches.
Ratio $a$ — 4.5 to 1.0
Divergence angle E — 7°
Total divergence angle F (FIG. 12) — 14°
Length of throats 72,72a — about 4 inches to 11 inches, depending upon insert position.

Having completed a detailed description of the preferred embodiment of the invention it can be seen that there is provided a scrubber which makes possible optimizing the design over a range of flow rates, which minimizes variations in friction losses in the scrubbing throats, and which reduces turbulence losses and hence minimizes the power requirements for moving gas through the venturi assembly. It has also been shown how to correlate various design and geometrical factors of the assembly to produce the aforesaid optimum results at all ranges in an adjustable insert device, while taking into consideration the practical features of connecting the device to conventionally configured inlet and outlet ducts.

An inverted construction can also be employed which provides the constant cross-sectional area scrubbing throats characteristic of the principal and preferred embodiment just described, but which has several disadvantages, the principal one being less energy recovery at the expander (exit) portion of the venturi passage. In the inverted construction the insert would be principally disposed in the inlet of the venturi instead of in the outlet or expander portion of the venturi. This design can be synthesized simply by inverting the entire assembly and reversing the direction of gas flow.

Although the best mode contemplated for carrying out the present invention has been herein shown and described, it will be apparent that modification and variation may be made without departing from what is regarded to be the subject matter of the invention.

We claim:

1. In a gas scrubbing venturi assembly of the type comprising a gas conduit with a venturi passage of rectangular cross section and having flat converging side walls forming an inlet passage and flat diverging side walls forming an outlet passage, said passage side walls joining to form a minimum cross section restriction, said passage having straight edge walls, and a gas guide insert of rectangular cross section axially centered in said venturi passage and having flat diverging-converging side walls joined to form a maximum cross section restriction that is normally downstream of said venturi passage restriction, said insert side walls bridging the straight edge walls of said venturi passage for confining gas flow between the side walls of the venturi passage and of the insert, and means for introducing a scrubbing liquid into said venturi inlet passage; the improvement wherein said assembly comprises a single venturi passage and a single insert, the width of the restriction of said venturi passage and the maximum width of said insert being substantially equal, the angle of divergence of said diverging venturi outlet passage side walls equaling the angle of divergence of said diverging insert side walls, said insert being positioned in said venturi passage so that said diverging insert side walls extend a substantial distance in the direction of gas flow from the minimum cross section restriction of said venturi passage, the diverging walls of said insert cooperating with the diverging walls of said venturi outlet passage to form two relatively diverging scrubbing throats, each of said throats being of constant cross sectional area along its length, said scrubbing throats being followed by two gradually enlarging exit throats formed by the diverging side walls of said venturi outlet passage and the converging side walls of said insert, and means for axially adjusting the position of said insert in the venturi passage.

2. The assembly of claim 1, wherein the ratio of the depth of each scrubbing throat, as measured along a side wall perpendicularly to said edge walls, to the width of each scrubbing throat, as measured perpendicularly to the axis of the venturi passage, lies in the range of from 8 to 1 to 1 to 1 when the insert is at its fully open position with the intersection of the diverging insert side walls disposed adjacent to the venturi passage restriction.

3. The assembly of claim 2, wherein said ratio is in the range of 4 to 1 to 5 to 1.

4. In a gas scrubbing venturi assembly of the type comprising a gas conduit with a venturi passage of rectangular cross section, said venturi passage having flat parallel sidewalls connected to flat converging side walls forming an inlet passage and connected to flat diverging side walls forming an outlet passage, said passage side walls joining to form a restriction having a rectangular cross section of minimum width, and a gas guide insert of rectangular cross section axially centered in said venturi passage, said insert having flat diverging upstream side walls and flat downstream side walls that form interior obtuse angles with the flat diverging side walls of the insert and which are joined to the diverging insert side walls to form a restriction having a rectangular cross section of maximum width that is normally downstream of said venturi passage restriction, said insert side walls bridging the flat edge walls of said venturi passage for confining gas flow between the side walls of the venturi passage and of the insert, and means for introducing a scrubbing liquid into said venturi inlet passage; the improvement wherein said assembly comprises a single venturi passage and a single insert, the width of the restriction of said venturi passage and the maximum width of said insert being substantially equal, the angle of divergence of said diverging venturi outlet passage side walls equaling the angle of divergence of said diverging insert side walls, said insert being positioned in said venturi passage so that said diverging insert side walls extend a substantial distance in the direction of gas flow from the minimum width cross section restriction of said venturi passage, the diverging walls of said insert cooperating with the diverging walls of said venturi outlet passage to form two relatively diverging scrubbing throats, each of said throats being of constant cross sectional area along its length, said scrubbing throats being followed by two gradually enlarging exit throats formed by the diverging side walls of said venturi outlet passage and the downstream side walls of said insert, and means for axially adjusting the position of said insert in the venturi passage.

* * * * *